(12) United States Patent
Yamoto et al.

(10) Patent No.: US 6,881,313 B2
(45) Date of Patent: Apr. 19, 2005

(54) CRATER INHIBITING METHOD AND CRATER INHIBITING AGENT FOR CATIONIC ELECTRODEPOSITION COATING COMPOSITION

(75) Inventors: Shuhei Yamoto, Osaka-fu (JP); Koichi Suda, Osaka-fu (JP); Kunio Murase, Hyogo-ken (JP)

(73) Assignee: Nippon Paint Co., Ltd., Osaka-fu (JP)

( * ) Notice: Subject to any disclaimer, the term of this patent is extended or adjusted under 35 U.S.C. 154(b) by 396 days.

(21) Appl. No.: 10/108,350

(22) Filed: Mar. 29, 2002

(65) Prior Publication Data

US 2003/0042142 A1 Mar. 6, 2003

(30) Foreign Application Priority Data

Mar. 30, 2001 (JP) .......................................... 2001-099386

(51) Int. Cl.[7] ................................................ C25D 13/10
(52) U.S. Cl. ........................................ 204/489; 204/499
(58) Field of Search .................................. 204/489, 499

(56) References Cited

FOREIGN PATENT DOCUMENTS

JP 2001-031739 A * 2/2001

* cited by examiner

Primary Examiner—Kishor Mayekar
(74) Attorney, Agent, or Firm—Wenderoth, Lind & Ponack, L.L.P.

(57) ABSTRACT

The present invention provides a novel crater inhibiting method and crater inhibiting agent not containing an acrylic resin and hence capable of increasing the opportunities to be added to coating compositions and improving degree of freedom in preparation methods of coating composition. The method comprises that electrodeposition coating is conducted by using an electrodeposition coating composition containing an aminopolyether modified epoxy having a polyether chain of specific structure as an additive.

6 Claims, No Drawings

CRATER INHIBITING METHOD AND CRATER INHIBITING AGENT FOR CATIONIC ELECTRODEPOSITION COATING COMPOSITION

FIELD OF THE INVENTION

The present invention relates to a method for preventing a crater from occurring in a coated film on electrodeposition coating, and in particular, to a method for inhibiting a crater from occurring in a coated film by carrying out electrodeposition coating with using an electrodeposition coating composition containing a specific aminopolyether modified epoxy resin as an additive.

BACKGROUND OF THE INVENTION

Cationic electrodeposition coating compositions are widely used industrially as a primer for automobile body because they exhibit excellent rust resistance. Generally, cationic electrodeposition coating compositions are provided in the form such that a binder component which comprises a cationic resin (such as amine modified epoxy resin, for example) and a curing agent (also referred to as a cross-linking agent such as blocked polyisocyanate compound, for example) and a pigment paste containing pigment dispersed with a pigment dispersing resin, are dispersed in an aqueous medium.

A cationic electrodeposition coated film is obtained by using such a coating composition for a coating bath, in which electric current is passed between an object to be coated as cathode and a counter electrode to form a deposition coated film on a surface of the object to be coated, followed by heating the deposition coated film for curing it by cross-linking. As for the cationic electrodeposition coated film obtained in this manner, it is desired that the coated film is smooth and does not have surface discontinuity such as dimple and recess referred to as a crater or cratering, and that even if an intermediate coating and/or a finish coating are applied thereon, sufficient adhesive property therewith can be achieved and no adverse affect is exerted on smoothness, gloss and the like.

It is generally considered that a crater occurs from a nucleus which may be an organic compound of low surface tension contained in the coating composition, impurities contained in the pigment, dusts in the oven used in a baking process or oil or the like which is scattered from panel gaps of a car body. In particular, oil etc. may cause a dimple on a coated surface because it bumps at the time of being baked to cure. Such a problem of cratering can be solved by removing the pollution sources, however, it is substantially difficult to practice in industrial scale. Furthermore, in order to prevent occurrence of a crater, such methods had been conducted that ratio of pigment to resin in a coated film was increased and molecular weight of a basic resin was increased to suppress flow of a coated film at the time of baking to lower level. However, both of these methods had a drawback that smoothness of the coated film became poor because of increased viscosity.

A number of additives (called crater inhibiting agent, leveling agent or crater inhibiting agent, all of which are substantially the same meaning) for preventing occurrence of a crater for a cationic electrodeposition coating composition have been reported heretofore. For example, Japanese Patent Kokai Publication No. HEI 2-4826 discloses an additive using polyoxyalkylenepolyamine, and Japanese Patent Kokai Publication No. HEI 6-184471 discloses a fluorine-containing copolymer. However, when the additives are added in an amount that is enough to exhibit sufficient crater inhibiting effect, the coating composition may significantly increase in viscosity, or decrease in adhesive property with PVC sealer, intermediate coated film or finish coated film to be coated on the electrodeposition coated film.

Furthermore, Japanese Patent Kokai Publication No. 2000-7959 discloses an electrodeposition coating composition containing an acrylic resin having an amino group, an acid group and a hydroxyl group in one molecule as an crater inhibiting agent. However, the acrylic resin is inferior in compatibility with other resin components in the electrodeposition coating composition. Therefore, opportunity that the crater inhibiting agent can be added to an electrodeposition coating composition is limited to when a binder component including an amine modified epoxy resin or the like is emulsified, so that degree of freedom in preparation process of coating composition is reduced. For this reason, it is desired to develop an crater inhibiting agent without containing an acrylic resin, or a crater inhibiting method which can improves degree of freedom of preparation process of coating composition.

SUMMARY OF THE INVENTION

The present invention solves the above-mentioned problems of the prior art, and it is an object of the present invention to provide a novel crater inhibiting method and crater inhibiting agent which increase opportunities to be added to a coating composition without containing an acrylic resin, and increase degree of freedom in preparation process of coating composition.

The present invention provides a method for inhibiting a crater from occurring in a coated film at the time when a coated film is formed by the method including the steps of: conducting electrodeposition coating on an object to be coated; and baking the electrodeposition coated film, wherein the electrodeposition coating is conducted with using an electrodeposition coating composition which contains the following aminopolyether modified epoxy having polyether chain, as an additive:

the aminopolyether modified epoxy having a number average molecular weight of 20,000 to 100,000, obtainable by allowing an aminopolyether having polyaikylene oxide chain and two primary amino groups or secondary amino groups and having a number average molecular weight of 150 to 3000 to react with a diepoxide having two epoxy groups and having a number average molecular weight of 300 to 7000 in such amounts that the primary amino groups or the secondary amino groups of the aminopolyether based on the epoxy groups of the diepoxide is 1.05 to 1.8 in equivalent ratio. Accordingly, the object is achieved.

The crater inhibiting agent is an aminopolyether modified epoxy having a number average molecular weight of 20,000 to 100,000, obtainable by allowing an aminopolyether having polyalkylene oxide chain and two primary amino groups or secondary amino groups and having an number average molecular weight of 150 to 3000 to react with a diepoxide having two epoxy groups and having a number average molecular weight of 300 to 7000 in such amounts that equivalent ratio of the primary amino groups or the secondary amino groups of the aminopolyether based on the epoxy groups of the diepoxide (amino group equivalent to epoxy equivalent) is 1.05 to 1.8.

In the specification, the term "crater inhibiting agent" means a surface conditioner to be added to a cationic electrodeposition coating composition for suppressing surface discontinuities such as dimple and recess. Further, the term "amine value" represents number of amino groups existing in a resin, and is expressed by weight (mg) of potassium hydroxide which is equivalent mol of the amino groups included in 1 g of the resin.

In the crater inhibiting method, the electrodeposition coating composition may further contain cationic gel particles as an additive in an amount of 1 to 5% by weight of the total solid content of the resin.

DETAILED DESCRIPTION OF THE INVENTION

Electrodeposition coating is conducted by immersing an object to be coated in an electrodeposition coating composition as cathode, and applying a voltage. The electrodeposition coating composition contains binder, pigment, solvent and various kinds of additives such as anticorrosion agent in an aqueous medium. The binder includes a cationic resin having a functional group and a curing agent for curing the cationic resin.

In the present invention, the cationic epoxy resin which is obtainable by allowing an active hydrogen compound such as amine to react with an epoxy ring of an epoxy resin to introduce a cationic group by opening the epoxy group, is used as a cationic resin, and the block polyisocyanate in which an isocyanate group of polyisocyanate is blocked is used as a curing agent.

Crater Inhibiting Agent

In the crater inhibiting method of the present invention, the electrodeposition coating composition further contains a specific crater inhibiting agent as an additive. In the electrodeposition coating composition, this crater inhibiting agent is dispersed in an aqueous medium together with other components such as a cationic resin.

And, it is considered that the crater inhibiting agent transfers to a surface of the electrodeposition coated film in the subsequent electrodeposition coating and baking processes, suppresses flowability of the coated film, thereby preventing occurrence of a crater.

The compound which is favorable as an crater inhibiting agent is aminopolyether modified epoxy having a polyether chain. This is because a polyether chain can give enough flexibility to a cured coated film, and a hydroxyl group derived from amino group or epoxy resin can react with the curing agent, so that corrosion resistance of the electrodeposition coated film will not decrease.

It is necessary to design the structure and the molecular weight of the aminopolyether modified epoxy having a polyether chain so that it exerts function as an crater inhibiting agent. For example, the aminopolyether modified epoxy can be prepared by allowing an aminopolyether and a diepoxide to react with each other. In this context, "aminopolyether" means a polymeric compound having a polyalkylene oxide chain (polyether chain) and two primary amino groups or secondary amino groups, and "diepoxide" means a polymeric compound having two epoxy groups. In this context, meanings of the terms "two primary amino groups or secondary amino groups" include the following cases: two primary amino group; two secondary amino groups; one primary amino group and one secondary amino group.

In the case where these two polymer compounds are allowed to react, they are blended in amounts so that the primary amino groups or the secondary amino groups of the aminopolyether is in the range of 1.05 to 1.8 in equivalent ratio based on the epoxy groups of the diepoxide. If this equivalent ratio is less than 1.05, a part of epoxy groups may remain at molecular terminal end of the resultant aminopolyether modified epoxy, which leads gelation due to growth of molecular weight. On the other hand, if the equivalent ratio exceeds 1.8, stability of the coating composition decreases due to generation of a compound of low molecular weight and free amine.

The reaction can be conducted in the same manner as a usual amine-epoxy reaction. As a catalyst, dimethylbenzylamine and 2-ethyl-4-metyl imidazole can be used. In such a case, number average molecular weight of the aminopolyether modified epoxy is controled to 20,000 to 100,000, preferably to 30,000.

As the aminopolyether, those having the following structure is preferably used.

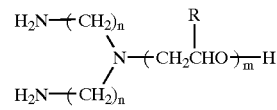

wherein R represents a hydrogen atom, a methyl group, or an ethyl group, m represents an integer of not less than 2, and n represents, independently, 2 or 3. This aminopolyether is characterized by having an alkylene chain as a side chain and having a primary or secondary hydroxyl group at terminal end of the alkylene chain.

In connection with this, the value of m which represents number of repeating units of the polyoxyalkylene chain is preferably an integer of 10 to 50, and more preferably an integer of 20 to 40. As described above, "m" represents number of repeating units of the polyoxyalkylene chain. R in the polyoxyalkylene chain is usually the same, however, polyoxyalkylene chain units may have different Rs.

Furthermore, in the formula, number of repeating units n of polymethylene chains bound to the primary amino group, preferably are independently 2 or 3, and more preferably both 2.

The aminopolyether is prepared by hydrolyzing polyoxyalkylene ketimine, and the concrete preparing process thereof is disclosed in Japanese Patent Kokai Publication No. HEI 1-249748. This aminopolyether has a number average molecular weight of 150 to 3000, preferably 500 to 2000.

As the diepoxide, a reaction product of polyoxyalkylene glycol glycidyl ether and dicarboxylic acid is preferable. Specific examples of the polyoxyalkylene glycol diglycidyl ether include polyoxyethylene glycol diglycidyl ether (epoxyether of polyethylene glycol), polyoxypropylene glycol diglycidyl ether, polyoxyisopropylene glycol diglycidyl ether, polyoxybutylene glycol diglycidyl ether and the like. Among them, polyoxyisopropylene glycol diglycidyl ether is preferred.

Alternatively, the polyoxyalkylene glycol diglycidyl ether preferably has a molecular weight of 300 to 1000. If the molecular weight is less than 300, shock resistance of the electrodeposition coated film is deteriorated, and if the molecular weight exceeds 1000, adhesive property with an intermediate coated film or a finish coated film is not satisfactory. The molecular weight of the diepoxide can be controlled by allowing an appropriate amount of dicarboxylic acid having a long chain alkyl group to react with the polyoxyalkylene glycol diglycidyl ether. Examples of such dicarboxylic acid include 1, 10-dodecane dicarboxylic acid, adipic acid and the like, and among them dimer acid (trade name: BARSADIME 216, Henkel Hakusui Co., Ltd.) is preferred.

Preferred blending ratio of the polyoxyalkyleneglycol diglycidylether and the dicarboxylic acid is, for example, 1.1/1 to 2/1 by mol ratio.

In the case of adding the aminopolyether modified epoxy to the cationic electrodeposition coating composition, it is preferred that the obtained aminopolyether modified epoxy is added to ion-exchange water containing a neutralizer and thoroughly stirred to make it an emulsion form.

As for the neutralizer, there is no limitation insofar as those usually used for preparation of a cationic electrodeposition coating composition, and specific examples thereof include inorganic acids or aorganic acids such as hydrochloric acid, nitric acid, phosphoric acid, formic acid, acetic acid and lactic acid. The neutralizer is used in an amount such that at least a part of the amino groups in said aminopolyether modified epoxy is neutralized to disperse the epoxy in the water.

For obtaining a stable emulsion of the aminopolyether modified epoxy obtainable in the manner, the aminopolyether modified epoxy has an amine value of preferably 32 meq per 100 g of solid content. If the amine value is less than 32 meq, water dispersibility will decrease.

Cationic Epoxy Resin

The cationic epoxy resin used in the present invention includes an amine-modified epoxy resin. The cationic epoxy resin may be those disclosed in Japanese Patent Kokai Publications No. SHO 54-4978 and SHO 56-34186.

The cationic epoxy resin is typically prepared by opening all epoxy rings in a bisphenol type epoxy resin by an active hydrogen compound which can introduce a cationic group, or by opening a part of epoxy rings by the other active hydrogen compound, while opening the remaining epoxy rings by an active hydrogen compound which can introduce a cationic group.

A typical example of the bisphenol type epoxy resin is the bisphenol A type or the bisphenol F type epoxy resin. The former is commercially available in the names of EPI-COAT™ 828 (Yuka-Shell Epoxy Co. Ltd., epoxy equivalent 180 to 190), EPICOAT™ 1001 (epoxy equivalent 450 to 500), EPICOAT™ 1010 (epoxy equivalent 3000 to 4000) and the like, and the latter is commercially available in the name of EPICOAT™ 807 (epoxy equivalent 170) and the like.

An oxazolidone ring containing epoxy resin as described by chemical formula 3 of paragraph [0004] in Japanese Patent Kokai Publication No. HEI 5-306327 may be used as the cationic epoxy resin. This is because a coated film which is superior in heat resistance and corrosion resistance can be obtained.

An oxazolidone ring is introduced into an epoxy resin, for example, by the step of heating a block polyisocyanate which is blocked by lower alcohol such as methanol and a polyepoxide in the presence of basic catalyst with removing lower alcohol generated as byproduct by distillation.

Especially preferred epoxy resin is an oxazolidone ring containing epoxy resin. This is because a coated film which is superior in heat resistance and corrosion resistance, as well as superior in shock resistance can be obtained.

It is known that an oxazolidone ring containing epoxy resin can be obtained by allowing a bi-functional epoxy resin to react with a diisocyanate that is blocked by monoalchol (i.e., bisurethane). Specific examples and preparation methods of the oxazolidone ring containing epoxy resin are disclosed, for example, in paragraphs [0012] to [0047] of Japanese Patent Kokai Publication No. 2000-128959.

These epoxy resins may be modified with an appropriate resin such as polyester polyol, polyether polyol and mono-functional alkyl phenol. Furthermore, a chain of the epoxy resin may be elongated by utilizing reaction between an epoxy group and a diol or dicarboxylic acid.

These epoxy resins are favorably ring-opened by an active hydrogen compound so that amine equivalent after ring opening is 0.3 to 4.0 meq/g, and more preferably primary amino groups make up 5 to 50% of the amino groups.

An active hydrogen compound that can introduce a cationic group includes primary amine, secondary amine and acid salt of tertiary amine, sulfide and acid mixture.

Specific examples of the active hydrogen compound include butylamine, octylamine, diethylamine, dibutylamine, methylbutylamine, monoethanolamine, diethanolamine, N-methylethanolamine, triethylamine hydrochloride, N,N-dimethylethanolamine acetate, diethyl disulfide/acetic acid mixture and the like, in addition to these, secondary amines obtainable by blocking primary amines such as ketimine of aminoethylethanolamine, diketimine of diethylenetriamine. A plural kinds of amines may be used.

Curing Agent

Polyisocyanate used for the curing agent of the present invention refers to a compound having two or more isocyanate groups in one molecule. For example, as the polyisocyanate, it may be any of aliphatic, alicyclic, aromatic and aromatic-aliphatic.

Specific examples of the polyisocyanate include aromatic diisocyanates such as tolylene diisocyanate (TDI), diphenylmethane diisocyanate (MDI), p-phenylene diisocyanate and naphthalene diisocyanate; aliphatic diisocyanates having 3 to 12 carbon atoms such as hexamethylene diisocyanate (HDI), 2,2,4-trimethylhexane diisocyanate and lysine diisocyanate; alycyclic diisocyanates having 5 to 18 carbon atoms such as 1,4-cyclohexane diisocyanate (CDI), isophorone diisocyanate (IPDI), 4,4'-dicyclohexylmethane diisocyanate (hydrogenated MDI), methylcyclohexane diisocyanate, isopropylidene dicyclohexyl-4,4'-diisocyanate and 1,3-isocyanatomethyl cyclohexane (hydrogenated XDI), hydrogenated TDI, 2,5- or 2,6-bis (isocyanatometyl) bicyclo [2.2.1] heptane (also referred to as norbornane diisocyanate); aliphatic diisocyanates having an aromatic ring such as xylylene diisocyanate (XDI) and tetramethylxylylene diisocyanate (TMXDI); and modified diisocyanates (urethanation compounds, carbodiimide, urethodione, urethoimine, biuret and/or isocyanurate modified compounds). These may be used alone or in combination of two or more.

An adduct or a prepolymer that can be obtained by reacting polyisocyanate with polyalcohol such as ethylene glycol, propylene glycol, trimethylolpropane or hexatriol at a NCO/OH ratio of not less than 2 can also be used as a curing agent.

It is preferred that the polyisocyanate is aliphatic polyisocyanate or alicyclic polyisocyanate. This is because a coated film which is superior in weather resistance can be formed.

Preferred specific examples of the aliphatic polyisocyanate or the alicyclic polyisocyanate include hexamethylene diisocyanate, hydrogenated TDI, hydrogenated MDI, hydrogenated XDI, IPDI, norbornene diisocyanate, and dimers (biuret) or trimers (isocyanurate) thereof.

A block agent is those capable of adding to a polyisocyanate group, and reproducing a free isocyanate when heated to dissociation temperature though it is stable at ambient temperature.

When curing at low temperature (not more than 160° C.) is desired, it is preferred to use lactam block agents such as ε-caprolactam, α-valerolactam, γ-butyrolactam and β-propiolactam, or oxime block agents such as formaldoxime, acetoaldoxime, acetoxime, methyl ethyl ketoxime, diacetyl monoxime and cyclohexane oxime as a block agent.

A binder which contains the cationic epoxy resin and the curing agent is contained in the electrodeposition coating composition, generally in an amount of occupying 25 to 85% by weight, preferably 40 to 70% by weight of the total solid content of the electrodeposition coating composition.

Pigment

An electrodeposition coating composition generally contains pigment as a colorant. Also the electrodeposition coating composition of the present invention contains commonly used pigment. Examples of such pigment include color pigments such as titanium white, carbon black and colcothar, extender pigments such as kaolin, talc, aluminum silicate, calcium carbonate, mica, clay and silica, rust preventive pigments such as zinc phosphate, iron phosphate, aluminum phosphate, calcium phosphate, zinc phosphite, zinc cyanide, zinc oxide, aluminum tripoliphosphate, zinc molybdate, aluminum molybdate, calcium molybdate, aluminum phosphomolybdate, and aluminum zinc phosphomolyb date.

The pigment is contained in the electrodeposition coating composition in an amount of occupying 1 to 35% by weight, preferably 15 to 30% by weight of the solid content of the electrodeposition coating composition.

Pigment Dispersion Paste

When pigment is used as a component of an electrodeposition coating composition, generally, the pigment is dispersed in an aqueous medium at high concentration in advance and made into a paste form. This is because pigment is of the powder form, and it is difficult to be dispersed uniformly into low concentration which is used in the electrodeposition coating composition, by one step. Such a paste is generally referred to as a pigment dispersion paste.

A pigment dispersion paste is prepared by allowing pigment to disperse in an aqueous medium together with a pigment dispersing resin. Generally, as the pigment dispersing resin, cationic or nonionic low molecular weight surface active agents or cationic polymers such as modified epoxy resins having a quaternary ammonium group and/or a tertiary sulfonium group are used. As the aqueous medium, ion-exchange water or water containing a small amount of alcohol is used. Generally, the pigment dispersing resin and the pigment are used in a solid content ratio of 5 to 40 parts by weight to 10 to 30 parts by weight.

Cationic Gel Particles

"Cationic gel particles" means resin particles having a cationic functional group on its surface and being crosslinked internally. A variety of processes for preparing cationic gel particles have been known heretofore. One of these processes is that an ethylenically unsaturated monomer and a cross-linking copolymerizable monomer are emulsion polymerized in an aqueous medium to obtain a dispersion liquid of cross-linked resin particles. By using a cationic surface active agent as an emulsifying agent in the process, a cationic functional group is provided to a surface of the resin particles.

Examples of an ethylenically unsaturated monomer include alkyl esters of acrylic acid or methacrylic acid such as methyl (meth)acrylate, ethyl (meth) acrylate, n-butyl (meth) acrylate, isobutyl (meth) acrylate and 2-ethylhexyl (meth)acrylate, and the other monomers having ethylenically unsaturated group which can copolymerize therewith, for example, styrene, α-methylstyrene, vinyltoluene, t-butylstyrene, ethylene, propylene, vinyl acetate, vinyl propionate, acrylonitrile, methacrylonitrile and dimethylaminoethyl (meth)acrylate. Two or more kinds of these monomers may be used.

The cross-linking copolymerizable monomer may be a multi-functional monomer having two or more ethylenically unsaturated groups in a molecule that are capable of radical polymerization.

Examples of such a multi-functional monomer having two or more ethylenically unsaturated groups capable of radical polymerization include polymerizable unsaturated monocarbonates of polyalcohol, polybasic acid esters of polymerizable unsaturated alcohol and aromatic compounds substituted with two or more vinyl groups, and examples of these compounds are as follows.

Ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxy dimethacryate, 1,1,1-trishydroxymethylethane diacrylate, 1,1,1-trishydroxymethylethane triacrylate, 1,1,1-trishydrxymethylethane dimethacrylate, 1,1,1-trishydrxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diallyl terephthalate, diallyl phthalate and vinylbenzene.

The cationic gel particles used in the present invention is prepared by polymerizing the aforementioned monomer mixture according to a known emulsion polymerization process except that at least the same kind of the cationic resin used in the electrodeposition coating composition is employed as an emulsifying agent. In this context, it is intended that the wording "the same kind of resin" allows more or less differences in monomer composition, molecular weight, functional group equivalent and the like insofar it is the same type of the resin. However, it is convenient to employ a part of the cationic resin used in the electrodeposition coating composition as the emulsifying agent.

Emulsion polymerization is carried out by dissolving or dispersing the cationic resin in an aqueous medium containing a neutralizing amount of acid, and dropping a monomer mixture thereto. Since it is necessary that the obtained cross-linked or non-cross-linked resin particle is covered with the cationic resin, the monomer mixture and the cationic resin are employed in an amount so that the covered particle is 30 to 97 parts by weight of a core part and 70 to 3 parts by weight of a cover layer.

Electrodeposition Coating Composition

A cationic electrodeposition coating composition to be used in the present invention is prepared by dispersing an crater inhibiting agent, a cationic epoxy resin, a block polyisocyanate curing agent, a neutralizer and a pigment dispersion paste in an aqueous medium containing a neutralizer. In addition to these components, the cationic electrodeposition coating composition to be used in the present invention preferably contains cationic gel particles. This is because crater inhibiting effect by the crater inhibiting agent is improved.

To be more specific, predetermined amounts of the cationic epoxy resin and the block polyisocyanate curing agent are mixed uniformly, the mixture is dispersed in an aqueous medium containing a neutralizer to obtain an emulsion of mixture of the cationic epoxy resin and the block polyisocyanate curing agent (hereinafter, referred to as a main emulsion).

On the other hand, crater inhibiting agent is made into an emulsion in the same manner as described above. Then, predetermined amounts of the main emulsion, the crater inhibiting agent emulsion, the pigment dispersion paste and ion-exchange water are blended and mixed, to thereby obtain the cationic electrodeposition coating composition of the present invention.

It is to be noted that method for preparing an emulsion of the crater inhibiting agent, the cationic epoxy resin and the block polyisocyanate curing agent is not limited to those described above, and for example, the three components may be separately made into emulsions, or three components may be made into emulsion after mixing all of them. Further, the crater inhibiting agent may be contained in the ion-exchange water containing the neutralizer at initial stage of the preparation process of the electrodeposition coating composition, or may be added after preparation of the electrodeposition coating composition.

As described above, the crater inhibiting agent of the present invention has increased opportunities of being added to an electrodeposition coating composition, so that preparation method of the electrodeposition coating composition can be modified in various ways. Accordingly, by using the crater inhibiting agent of the present invention, degree of freedom in preparation method of an electrodeposition coating composition improves.

In this context, it is preferred that the crater inhibiting agent of the present invention is added in an amount of 1 to 15% by weight of the total solid content of the resin in the cationic electrodeposition coating composition. If the addition amount is less than 1% by weight, it is impossible to give satisfactory crater inhibiting property to the electrodeposition coated film. On the other hand, if the addition amount exceeds 15% by weight, corrosion resistance of the electrodeposition coated film will be deteriorated.

An amount of the block polyisocyanate curing agent is the satisfactory amount for that the curing agent reacts with an active hydrogen containing functional group such as an amino group or a hydroxyl group in the cationic epoxy resin at the time of heat curing and to give a preferable cured coated film. It is generally 50/50 to 90/10, preferably 65/35 to 80/20 when represented by solid content ratio by weight of the cationic epoxy resin based on the block polyisocyanate curing agent.

The block polyisocyanate curing agent also reacts with a hydroxyl group in the crater inhibiting agent, and the amount as described above also allows to react with the hydroxyl group.

The pigment dispersion paste is blended so that the pigment occupies 1 to 35% based on the total solid weight in the cationic electrodeposition coating composition.

In the case where the cationic gel particles are added to the electrodeposition coating composition, the gel particles are added so that the solid content thereof is 1 to 5% by weight based on the total resin solid content in the electrodeposition coating composition. If the addition amount of the cationic gel particles is less than 1% by weight, improvement in crater inhibiting effect is insufficient, and if the addition amount exceeds 5% by weight, appearance of the coated film may become inferior.

The cationic electrodeposition coating composition to be used in the present invention may contain a tin compound such as dibutyltin dilaurate or dibutyltin oxide, or a usual urethane cleavage catalyst. The addition amount thereof is preferably 0.1 to 5.0% by weight of the block polyisocyanate curing agent.

In addition, the cationic electrodeposition coating composition to be used in the present invention may contain commonly used additives for coating composition such as water miscibile organic solvent, surface active agent, oxidation inhibiting agent and ultraviolet absorbing agent.

Crater Inhibiting Method

In carrying out electrodeposition coating, an object to be coated is not limited to but those having conductivity, and iron plate, steel plate, aluminum plate, and surface-treated objects thereof, and molded objects thereof can be exemplified. In particular, when an automobile body is used as an object to be coated, advantages of the present invention is exerted.

Electrodeposition coating is carried out, in general, by filling an electrodeposition bath with the electrodeposition coating composition containing the crater inhibiting agent of the present invention, and applying a voltage of usually 50 to 450 V between the object to be coated serving as cathode and anode. If the applied voltage is less than 50 V, the electrodeposition becomes insufficient, and if the applied voltage exceeds 450 V, power consumption increases, which leads lack of economy.

Preferred temperature of the bath filled with the electrodeposition coating composition in the case of applying the voltage is, generally 10 to 45° C.

The electrodeposition process preferably comprises the steps of (i) immersing an object to be coated in an electrodeposition coating composition, and (ii) applying a voltage between said object to be coated as cathode and anode to cause deposition of coated film. Also, the period of time for applying the voltage can be generally 2 to 4 minutes, though it varies with the electrodeposition condition.

The electrodeposition coated film obtained in the manner as described above is baked at a temperature of 120 to 260° C., preferably 160 to 220° C. for 10 to 30 minutes to be cured directly or after being washed with water after completion of the electrodeposition process.

Thickness of the electrodeposition coated film after being cured is preferably 10 to 25 $\mu$m. If it is less than 10 $\mu$m, corrosion resistance is insufficient, and if it exceeds 25 $\mu$m, it leads waste of the coating composition.

The electrodeposition coated object is further subjected to intermediate coating, finish coating and/or sealer coating if necessary in accordance with its purpose.

Effect of the Invention

The crater inhibiting agent for cationic electrodeposition coating composition of the present invention does not contain an acrylic resin, and is superior in compatibility with other resin components of the electrodeposition coating composition. Therefore, a cationic electrodeposition coating composition containing the crater inhibiting agent of the present invention is superior in storage stability, and an electrodeposition coated film containing the crater inhibiting agent of the present invention is excellent in adhesive property with an intermediate coated film or a finish coated film. Furthermore, it is possible to increase opportunities to be added to a coating composition, which improves degree of freedom in preparation method of a coating composition.

EXAMPLES

The present invention will be further explained in detail in accordance with the following examples, however, the present invention is not limited to these examples. In the examples, "part" and "%" are based on weight unless otherwise specified. "Epoxy equivalent" and "amine equivalent" are values per solid content.

Preparation Example 1

Preparation of Cationic Epoxy Resin 92 parts of 2,4-/2,6-tolylene diisocyanate (weight ratio= 8/2), 95 parts of methyl isobutyl ketone (hereinafter, referred to as MIBK) and 0.5 part of dibutyltin dilaurate were loaded to a flask equipped with a stirrer, a cooling tube, a nitrogen introducing tube, a thermometer and a dropping funnel. 21 parts of methanol was added while stirring the mixture.

Starting at room temperature, the reaction mixture was allowed to rise to 60° C. by exothermic, the reaction was retained for 30 minutes, and 57 parts of ethylene glycol mono-2-ethylhexylether was dropped from the dropping funnel. Furthermore, 42 parts of bisphenol A-propylene oxide 5 mol adduct (trade name: NEWPOLE BP-5P, Sanyo Kasei Kogyo K. K.) was added. The reaction was carried out mainly in the temperature range of 60 to 65° C., and continued until absorption based on an isocyanate group disappeared in IR spectrum measurement.

Next, 365 parts of bisphenol A type epoxy resin of epoxy equivalent 188 synthesized from bisphenol A and epichlorohydrin in accordance with a known method (trade name DER-331J, manufactured by Dow Chemical Co., Ltd.) was added to the reaction mixture and heated to 125° C. After that, 1.0 part of benzyldimetylamine was added and allowed to react at 130° C. until epoxy equivalent became 410.

Subsequently, 87 parts of bisphenol A was added and allowed to react at 120° C. to achieve epoxy equivalent of 1190. Thereafter, the reaction mixture was cooled, and 11 parts of diethanolamine, 24 parts of N-ethylethanolamine and 25 parts of 79% solution in MIBK of ketimined aminoethyl ethanolamine were added, and was allowed to react for 2 hours at 110° C. Then, the reaction mixture was diluted with MIBK until non-volatile content became 80%, and a cationic epoxy resin (resin solid content: 80%) was obtained.

Preparation Example 2

Preparation of Block Polyisocyanate Curing Agent 723 parts of 2,5- and 2,6-bis(isocyanatomethyl)-bicyclo [2.2. 1] heptane (manufactured by Mitsui Kagaku K. K., isocyanate equivalent 103), 333 parts of MIBK and 0.01 parts of dibutyltin dilaurate were loaded to the flask of the same kind as that of Preparation example 1. The resultant reaction mixture was heated to 70° C., and after the reaction mixture was uniformly dissolved, 610 parts of methyl ethyl ketoxime was dropped thereto over 2 hours. After completion of the dropping, the reaction was retained while reaction temperature was kept at 70° C. until absorption based on an isocyanate group disappeared in IR spectrum measurement, and a methyl ethyl ketooxym block polyisocyanate curing agent was obtained (resin solid content: 80%).

Preparation Example 3

Preparation of Pigment Dispersing Resin 222.0 parts of isophorone diisocyanate (hereinafter, referred to as IPDI) was loaded in a reaction vessel equipped with a stirrer, a cooling tube, a nitrogen introducing tube and a thermometer, and after diluted with 39.1 parts of MIBK, 0.2 part of dibutyltin dilaurate was added. Then, the reaction mixture was heated to 50° C., and 131.5 parts of 2-ethyl hexanol was dropped under dry nitrogen atmosphere over 2 hours with stirring. Reaction temperature was kept at 50° C. by cooling as necessary. As a result of this, 2-ethyl hexanol half blocked IPDI was obtained.

Subsequently 376.0 parts of Epicoat 828 (bisphenol A type epoxy resin manufactured by Yuka-Shell Epoxy Co. Ltd., epoxy equivalents 182 to 194), 114.0 parts of bisphenol A and 29.2 parts of octyl acid were loaded to a reaction vessel equipped with a stirrer, a cooling tube, a nitrogen introducing tube and a thermometer. The reaction mixture was heated to 130° C. under nitrogen atmosphere, and 0.15 part of dimethylbenzylamine was added to allow the reaction mixture to react for 1 hour at 170° C. under exothermic reaction, to thereby obtain a bisphenol A type epoxy resin having an epoxy equivalent of 649.

Then, after cooling to 140° C., 396.8 parts of 2-ethyl hexanol half blocked IPDI prepared above was added, and the reaction mixture was held at 140° C. for 1 hour so as to react. Next, after being diluted by adding 323.2 parts of ethyleneglycol monobutylether, the reaction mixture was cooled to 100° C. Next, 188.8 parts of 78.3% solution in MIBK of methyl isobutyl monoketimined aminoethylethanolamine was added.

After keeping the mixture at 110° C. four 1 hour, the mixture was cooled to 90° C., and 360.0 parts of ion-exchange water was added, and stirred 30 minutes, to thereby convert a ketimine portion in the epoxy resin to a primary amino group. After removing excess water and MIBK from this mixture under reduced pressure, the resultant mixture was diluted with 588.1 parts of ethylene glycol monobutyl ether, and a pigment dispersing resin having a primary amino group was obtained (resin solid content: 50%).

Preparation Example 4

Preparation of Pigment Dispersion Paste 60 parts of the pigment dispersing resin obtained in Preparation example 3, 2.0 parts of carbon black, 100.0 parts of kaolin, 80.0 parts of titanium dioxide, 18.0 parts of aluminum phosphomolibudate and 251 parts of ion-exchange water were loaded into a sand grinding mill, and they were dispersed until particle size was not more than 10 $\mu$m, to obtain a pigment dispersion paste.

Preparation Example 5

Preparation of Cationic Gel Particles 100 parts of the cationic epoxy resin obtained in Preparation example 1 was added to 120 parts of deionized water to which 0.27 part of acetic acid had been previously added and diluted, to obtain a cationic epoxy resin solution.

Next, 12.6 parts of the cationic epoxy resin solution obtained, 0.27 part of glacial acetic acid, and 120 parts of deionized water were loaded in a reaction vessel equipped with a heating stirrer, a thermometer, a nitrogen introducing tube and a cooling tube, and heated to 75° C. To this reaction mixture, an initiation solution (A) composed of 0.5 part of 2,2'-azobis (N,N'-dimethylisobutylamidine), 0.23 part of glacial acetic acid and 20 parts of deionized water was loaded, and 10 parts of methyl methacrylate was dropped over 5 minutes.

Subsequently, a monomer suspension (B) prepared by mixing 37.8 parts of the cationic epoxy resin solution obtained, 0.81 part of glacial acetic acid, 103.49 parts of deionized water, 12 parts of styrene, 10 parts of n-butyl acrylate, 52.5 parts of methyl methacrylate, 2 parts of glycidyl methacrylate, 3.5 parts of PLACCEL FM -1 (manufactured by Daisel Kagaku Kogyo K. K.) and 10 parts of neopentyl glycol dimethacrylate was dropped over 40 minutes and the reaction was stopped after stirring for 1 hour.

An emulsion containing cationic gel particles having an average particle size of 78 nm (solid content: 36%) was obtained.

Example 1

Preparation of Crater Inhibiting Agent A 129.7 parts of CHEMIOL EP-400P (polypropylene glycol diglycidyl ether manufactured by Sanyo Kasei Kogyo K. K., epoxy equivalent 297) and 99.6 parts of BARSADIME 216 (dimer acid manufactured by Henkel Hakusui Co. Ltd., acid value 192) and 0.6 part of benzyldimethylamine were added to a reaction vessel equipped with a stirrer, a thermometer, a reflux cooling tube and a nitrogen introducing tube, and the mixture was allowed to react at 160° C. until acid value became not more than 0.5, to obtain diepoxide having an epoxy equivalent of 2300. Next, 41.0 parts of aminopolyether having an amine value of 255 (diethylenetriamine propylene oxide adduct manufactured by Sanyo Kasei Kogyo K. K., trade name: AP-10, molecular weight 684) was added to this compound, and the reaction mixture was kept at 80° C. for 4 hours, to obtain an aminopolyether modified epoxy having a number average molecular weight of 27000 (hereinafter, referred to as crater inhibiting agent A).

Examples 2 and 3

Preparation of Crater Inhibiting Agents B and C

Crater inhibiting agents B and C were obtained in the same manner as Example 1 except that the blending amounts of the respective components were changed as shown in Table 1.

TABLE 1

|  |  | Example 1 | Example 2 | Example 3 |
|---|---|---|---|---|
| Crater inhibiting agent |  | A | B | C |
| Amount of EP-400P[a] (parts) |  | 129.7 | 129.7 | 129.7 |
| Amount of BARSADIME[b] (parts) |  | 99.6 | 99.6 | 99.6 |
| Molecular weight of diepoxide (Mn) |  | 4600 | 4600 | 4600 |
| Amount of amino-polyether[c] (parts) | AP-10 (Molecular weight 684) | 41.0 | — | 37.6 |
|  | AP-40 (Molecular weight 2424) | — | 145.4 | — |
| Equivalent ratio of epoxy group/amino group |  | 5/6 | 5/6 | 10/11 |
| Molecular weight of crater inhibiting agent (Mn) |  | 27000 | 37000 | 53400 |

[a]CHEMIOL EP-400P (polypropylene glycol diglycidyl ether manufactured by Sanyo Kasei Kogyo K.K., epoxy equivalent 297)
[b]BARSADIME 216 (dimer acid manufactured by Henkel Hakusui Co. Ltd., acid value 192)
[c]diethylenetriamine propylene oxide adduct manufactured by Sanyo Kasei Kogyo K.K., (trade name: AP-10 and AP-40)

Comparative Examples 1 to 3

Preparation of Crater Inhibiting Agents D to F

Crater inhibiting agents D to F were obtained in the same manner as Example 1 except that the blending amounts of the respective components were changed as shown in Table 2.

TABLE 2

|  | Comparative Example 1 | Comparative Example 2 | Comparative Example 3 |
|---|---|---|---|
| Crater inhibiting agent | D | E | F |
| Amount of EP-400P[a] (parts) | 129.7 | 129.7 | 129.7 |
| Amount of BARSADIME[b] (parts) | 99.6 | 99.6 | 99.6 |
| Molecular weight of diepoxide (Mn) | 4600 | 4600 | 4600 |
| Amount of aminopolyether[c] (parts) | 68.4 | 51.3 | 45.6 |
| Equivalent ratio of epoxy group/amino group | 1/2 | 2/3 | 3/4 |
| Molecular weight of crater inhibiting agent (Mn) | 6000 | 11200 | 16500 |

[a]CHEMIOL EP-400P (polypropylene glycol diglycidyl ether manufactured by Sanyo Kasei Kogyo K.K., epoxy equivalent 297)
[b]BARSADIME 216 (dimer acid manufactured by Henkel Hakusui Co. Ltd., acid value 192)
[c]diethylenetriamine propylene oxide adduct manufactured by Sanyo Kasei Kogyo K.K., (trade name: AP-10)

Example 4

(1) Preparation of Electrodeposition Coating Composition 261.1 parts of the crater inhibiting agents prepared in Example 1 was added to a mixture solution of 12.2 parts of 50% lactic acid and 379.1 parts of ion-exchange water and thoroughly stirred. 279.7 parts of ion-exchange water was added slowly to obtain an emulsion of a crater inhibiting agent.

On the other hand, the cationic epoxy resin obtained in Preparation example 1 and the block polyisocyanate curing agent obtained in Preparation example 2 were uniformly mixed in solid content ratio of 70:30. This mixture was diluted by slowly adding it to ion-exchange water to which glacial acetic acid had been added so that neutralized percentage was 43%, to obtain an emulsion. Next, MIBK was removed under reduced pressure so that solid content was 36.0%. This emulsion thus obtained is referred to as a main emulsion.

1488.3 parts of this main emulsion, 511.1 parts of the pigment dispersion paste obtained in Preparation example 4, 122.1 parts of the crater inhibiting agent prepared, 1869.9 parts of ion-exchange water and 8.6 parts of dibutyltin oxide were mixed, and a cationic electrodeposition coating composition having a solid content of 20.0% was obtained. Solid content ratio by weight between the pigment and the total resin in the electrodeposition coating composition was 1/3.

(2) Evaluation of Storage Stability 122.1 parts of the emulsion of the crater inhibiting agent and 1488.3 parts of the main emulsion obtained were mixed, and left for 4 weeks at 40° C. Then, presence of sediment was evaluated by visual observation.

Evaluation criteria
 ◯: no sediment
 x: sediment observed (3) Evaluation of Crater Inhibiting Property (Crater)

A test piece having a dimension of 7×15 cm was horizontally placed at the position of 10 cm deep in a coating bath filled with the cationic electrodeposition coating composition, and left still for 5 minutes. Next, at coating bath temperature of 30° C., electrodeposition was conducted so that dry film thickness was 20 μm, and the test piece was washed with water, left for 30 minutes, and then baked at 160° C. for 10 minutes. The coated surface after baking was visually observed number of craters was counted, and evaluation was made in accordance with the following evaluation criteria.

Evaluation criteria

○: 0 or 1 crater x: 2 or more craters (4) Evaluation of Crater Inhibiting Property (Oil-contaminated Cratering Property)

30 ppm of rust-proofing machine oil was contaminated in the obtained electrodeposition coating composition and the resultant composition was continuously stirred for 48 hours. Then, evaluation was carried out in the same manner as the procedure (3) except that a test piece having a dimension of 7×15 cm was vertically placed and electrodeposition was performed so that dry film thickness was 20 μm.

(5) Adhesive Property to Finish Coated Film

ORGASELECT 130 manufactured by Nippon Paint Co., Ltd. (alkyd resin type finish coating composition) was applied on the coated film obtained by the procedure (3) as a finish coating composition. Linear nicks were made on the coated film with a cutter knife so that 100 grids of 2×2 mm in square size can be obtained. CELLOPHANE TAPE™ was fixed on the grids, the tape was rapidly removed, and number of the grids that remained on the coated film was counted, and evaluation was made in accordance with the following evaluation criteria.

Evaluation criteria

○: remaining number 95 to 100 x: remaining number 0 to 95

Results of the evaluation are shown in Table 3.

Examples 5 and 6

Electrodeposition coating compositions were prepared in the same manner as Example 4 except that the crater inhibiting agents of Examples 2 and 3 were respectively used in place of the crater inhibiting agent of Example 1, and the crater inhibiting properties were evaluated. Results of the evaluation are shown in Table 3.

Example 7

An electrodeposition coating composition was prepared in the same manner as Example 4 except that the cationic gel particles obtained in Preparation example 5 was added to the main emulsion in such an amount that occupies 3% by weight of the total solid content contained in the electrodeposition coating composition, and crater inhibiting property was evaluated. Results of the evaluation are shown in Table 3.

Comparative Examples 4 to 6

Electrodeposition coating compositions were prepared in the same manner as Example 4 except that the crater inhibiting agents of Comparative examples 1 to 3 were respectively used in place of the crater inhibiting agent of Example 1, and crater inhibiting properties were evaluated. Results of the evaluation are shown in Table 3.

TABLE 3

| Example No. | Crater inhibiting agent | Storage stability | Crater inhibiting | Oil cratering | Adhesive |
|---|---|---|---|---|---|
| 4 | A | ○ | ○ | ○ | ○ |
| 5 | B | ○ | ○ | ○ | ○ |
| 6 | C | ○ | ○ | ○ | ○ |
| 7 | A | ○ | ○ | ○ | ○ |
| Comparative example 4 | D | X | X | X | ○ |
| Comparative example 5 | E | ○ | X | X | ○ |
| Comparative example 6 | F | ○ | X | X | ○ |

We claim:

1. A method for inhibiting a crater from occurring in a coated film at the time when a coated film is formed, which comprises cathodically conducting electrodeposition coating on an object to be coated; and baking the electrodeposition coated film, wherein the electrodeposition coating is conducted with a cationic electrodeposition coating composition which contains the following aminopolyether modified epoxy having polyether chain, as an additive:

the aminopolyether modified epoxy having a number average molecular weight of 20,000 to 100,000, obtained by allowing an aminopolyether having polyalkylene oxide chain and two primary amino groups or secondary amino groups and having a number average molecular weight of 150 to 3000 to react with a diepoxide having two epoxy groups and having a number average molecular weight of 300 to 7000 in such amounts that the primary amino groups or the secondary amino groups of the aminopolyether based on the epoxy groups of the diepoxide is 1.05 to 1.8 in equivalent ratio.

2. The method according to claim 1, wherein said aminopolyether has the structure represented by the formula:

$$H_2N\!-\!(CH_2)_n\!\!\diagdown\!\!N\!-\!(CH_2CHO)_m\!-\!H \atop H_2N\!-\!(CH_2)_n\!\!\diagup\!\!\phantom{N}\phantom{-}\overset{R}{|}\phantom{-}\phantom{-}\phantom{H}$$

I wherein, R represents a hydrogen atom, a methyl group, or an ethyl group, and m represents an integer of 2 or more, and n represents, independently, 2 or 3.

3. The method according to claim 1, wherein said diepoxide is obtained by allowing a polyoxyalkylene glycol diglycidyl ether having a molecular weight of 300 to 1000 to react with a dicarboxylic acid having long chain alkyl group.

4. The method according to claim 3, wherein said polyoxyalkylene glycol diglycidyl ether is polyoxyisopropylene glycol diglycidyl ether and said dicarboxylic acid having long chain alkyl group is dimer acid.

5. The method according to claim 1, wherein content of said aminopolyether modified epoxy is 1 to 15% by weight in total solid content of the cationic electrodeposition coating composition.

6. The method according to claim 1, wherein said cationic electrodeposition coating composition further contains a cationic gel particle in an amount that occupies 1 to 5% by weight of total resin solid content as an additive.

* * * * *